United States Patent [19]
Haskins

[11] 3,746,357
[45] July 17, 1973

[54] SNOWMOBILE AMBULANCES

[76] Inventor: David R. Haskins, Route 3, Tomahawk, Wis. 54487

[22] Filed: Oct. 18, 1971

[21] Appl. No.: 189,870

[52] U.S. Cl.............. 280/15, 180/5 R, 280/17, 280/24, 296/19
[58] Field of Search............ B62b/13/00; 280/15, 280/16, 17, 18, 24; 296/19, 20, 56, 95 Q, 78 R, 78 A; 98/2.07, 2.16; 180/5 R

[56] References Cited
UNITED STATES PATENTS

| | | | |
|---|---|---|---|
| 1,770,078 | 7/1930 | Landerdahl | 280/17 |
| 2,125,023 | 7/1938 | Hedin | 98/2.16 X |
| 3,565,452 | 2/1971 | Trumley et al. | 280/15 |
| 2,301,512 | 11/1942 | Breese | 98/2.16 |
| 3,638,551 | 3/1970 | Morchen et al. | 98/2.16 |
| 2,944,601 | 7/1960 | Compson | 296/95 C |
| 3,266,560 | 8/1966 | Mooskian | 296/84 R X |

FOREIGN PATENTS OR APPLICATIONS

| | | | |
|---|---|---|---|
| 1,024,622 | 1/1953 | France | 296/19 |
| 286,454 | 3/1928 | Great Britain | 296/78 A |

OTHER PUBLICATIONS

Sno Cruiser Advertisement, General Aluminum Products, Inc. May 21, 1971, Page 4.

Primary Examiner—Leo Friaglia
Assistant Examiner—David M. Mitchell
Attorney—Joseph G. Werner, John M. Winter et al.

[57] ABSTRACT

An ambulance sled for towing with a snowmobile. The ambulance sled has a pair of non-steerable rear skis and a tow bar assembly attached to a steerable front ski. An enclosed fiberglass body shell is mounted on the leaf-spring ski units and has a rear end door to facilitate insertion and removal of a stretcher. The bottom of the body shell has a pair of longitudinal recessed tracks in which the stretcher wheels run and for holding the stretcher in place. The body shell has a window in its top side and a pair of air intake scoops mounted forwardly of the window.

3 Claims, 4 Drawing Figures

INVENTOR:
DAVID R. HASKINS

PATENTED JUL 17 1973 3,746,357

INVENTOR:
DAVID R. HASKINS

SNOWMOBILE AMBULANCES

BACKGROUND OF THE INVENTION

This invention relates generally to emergency vehicles for transporting an injured or sick person over snow-covered terrain and more specifically to an enclosed ambulance sled adapted to be towed by a snowmobile for transporting injured skiers, snowmobilers, hunters, winter vacationers, and other accident victims for medical attention.

How to safely transport sick or injured persons from snow-covered locations inaccessible to wheeled vehicles has been a problem of long standing. For years injured skiers, for example, have been brought down the slopes strapped to toboggans guided fore and aft by ski patrol members. More recently, the toboggans or open sleds on which the injured are strapped have generally been pulled with snowmobiles.

In accident situations involving winter sport enthusiasts with broken legs, back and neck injuries, or the like it is, of course, of critical importance that the injured be transported for medical attention without undue jostling which could seriously aggravate the injury. Accordingly, it is encumbent upon county sheriff departments, ski lodge and winter resort owners, and others charged with similar responsibilities to provide the best emergency transportation available to injured persons.

SUMMARY OF THE INVENTION

This invention resides basically in providing an improved ambulance vehicle for towing with a snowmobile whereby an injured person may be transported safely for medical attention. The ambulance has a steerable front ski unit with an attached tow bar assembly and a rear ski unit. An enclosed fiberglass body shell is longitudinally mounted on the leaf-spring ski units. The shell has a rear door for removing and reinserting a wheel-supported stretcher. The stretcher is guided and maintained in place in the shell by a pair of recessed tracks formed in the bottom of the shell.

The invention provides safe transportation for an injured individual in relative comfort protected from the weather. It eliminates multiple handling of the injured in that once he is placed on the stretcher he can remain there until he reaches a hospital or other point of medical treatment. It also minimizes jostling of the injured during movement over rough snow-covered terrain.

Further objects, features and advantages of the invention will be apparent from the following detailed description taken in conjunction with the accompanying drawings showing a preferred embodiment for exemplification.

DESCRIPTION OF PREFERRED EMBODIMENTS

Figure 1:
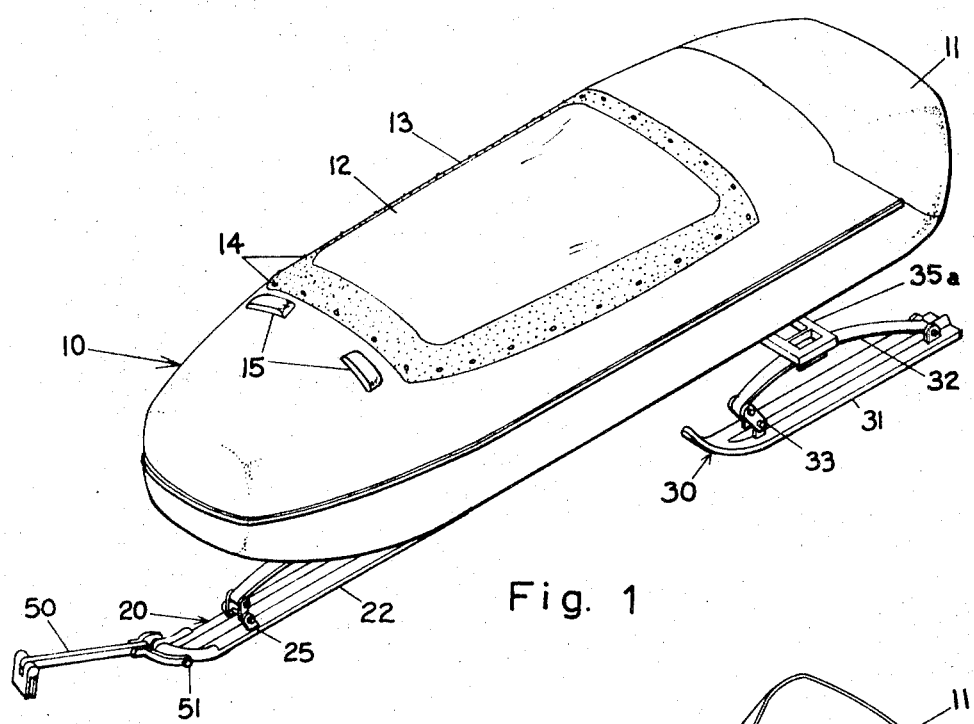
FIG. 1 is a front-top isometric view of a snowmobile ambulance embodying the invention.
Figure 2:
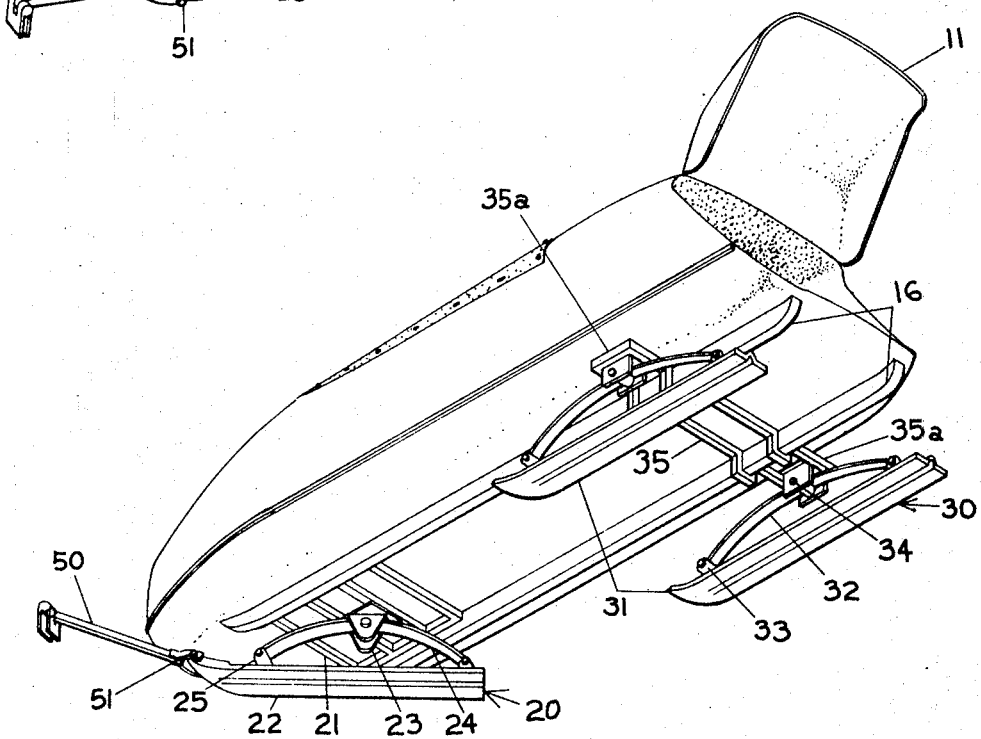
FIG. 2 is a bottom-rear isometric view of the snowmobile ambulance shown in FIG. 1 with the rear door in open position.

Referring now more particularly to the drawings wherein like numerals refer to like parts throughout the several views, as best shown in FIGS. 1 and 2, the snowmobile ambulance has a body shell 10 mounted on a steerable front ski unit 20 and a non-steerable rear double ski unit 30.

Figure 4:
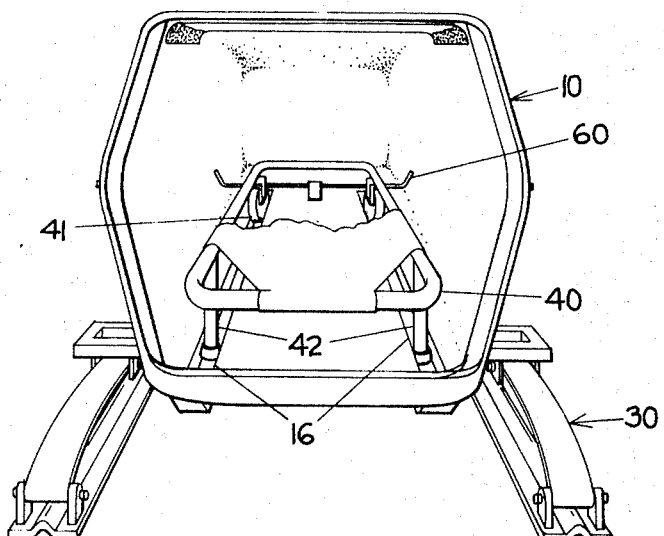
FIG. 4 is a rear isometric view looking into the snowmobile ambulance of FIG. 1 with the rear door removed and the stretcher in place.

The body shell 10 is preferably molded of fiberglass and has a rear door 11 hinged at its upper edge for opening the rear end of the enclosed body shell as shown in FIGS. 1 and 2 to permit insertion and removal of a stretcher 40 shown in FIG. 4.

The body shell has a window opening 12 formed therein which is closed by a plastic window covering 13 releasably secured to the shell by snap attachments 14. Any suitable means of attachment may, of course, be utilized, but the window covering should preferably be easily removable to permit immediate access to the injured should he require emergency attention while in the ambulance as discussed more fully hereinafter.

It is understood that a substantially rigid "bubble top" plastic window covering (not shown) may be provided, if desired. It also can be attached by any suitable means which would permit access through the window opening if necessary.

As shown in FIG. 1, a pair of air scoops 15 are provided on the top of the body shell forwardly of the window opening to cause air to flow into the shell for the injured and to pass air across the window covering to prevent the condensation of moisture or the formation of frost thereon.

Figure 3:
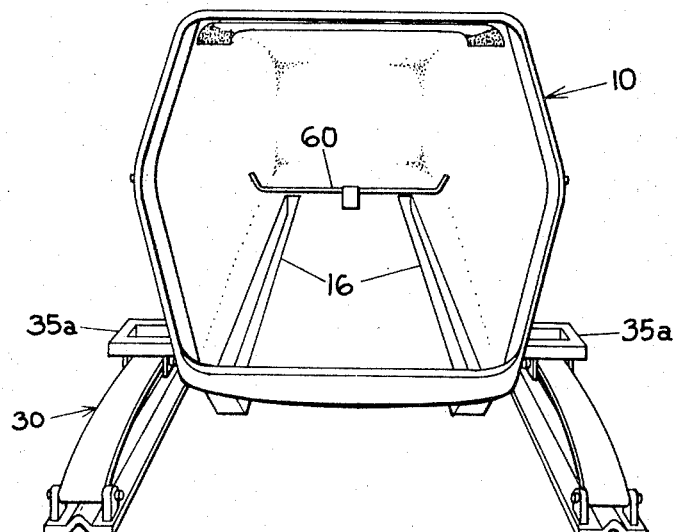
FIG. 3 is a rear isometric view looking into the snowmobile ambulance of FIG. 1 with the rear door and stretcher removed.

As shown in FIGS. 2-4 the body shell has a pair of longitudinally extending interior recessed tracks 16 formed in the bottom thereof. The recessed tracks appear as depending ridges on the exterior of the shell as seen in FIG. 2.

The front end of the body shell is supported on the steerable front ski unit 20 by means of an attaching frame 21 bolted to the bottom of the shell between the longitudinal depending ridges. A single ski 22 is pivotally secured at 23 to the attaching frame by a leaf-spring 24 for limited pivotal movement about both a horizontal and vertical axis. The front ski is permitted to swing approximately 45° to either side of front and center and is shown swung to one side in FIG. 2 for illustration. The front of the leaf-spring is attached to the ski 22 by a "knee-action" joint 25 as shown in FIGS. 1 and 2.

A tow bar assembly 50 is pivotally attached at 51 to permit attachmment to and towing by a snowmobile.

The rear end of the body shell is mounted on a non-steerable rear ski unit 30. The rear ski unit has a pair of skis 31 attached to the front end of leaf-springs 32 by "knee-action" joints 33. The leaf springs 32 are pivotally attached at 34 for limited movement about a horizontal axis to a cross-frame 35 which is bolted to the bottom of the body shell.

The knee-action leaf-spring mountings and limited pivotal movement about horizontal axes permit the skis to smoothly ride over uneven snow terrain and absorb a substantial portion of the bumpiness and jostling which would otherwise be transmitted to the body shell and injured person with a rigid ski or runner arrangement.

As shown in FIG. 4, a stretcher 40 having a pair of front wheels 41 and a pair of rear legs 42 is positioned in the body shell. The wheels of the stretcher are received in and run in the recessed tracks 16 to guide the stretcher while it is being pushed into the shell and the wheels and legs both are held in the tracks to maintain the stretcher in place while the ambulance is being towed. A metal cross-bar 60 provides an abutment to prevent forward displacement of the stretcher.

In situations where the person being transported is very severely injured and in need of life sustaining treatment such as the administering of oxygen from a portable unit during transportation, an attendant may ride on the ambulance to administer to the patient by straddling the body shell between the window 12 and the rear door 11 and placing his feet on the foot rests provided by the extensions 35a of the frame 35 of the rear ski unit. In such cases, of course, the window cover 13 would be left off or partially open to give the attendant access to the injured.

It is understood that the invention is not confined to the particular construction and arrangement of parts herein illustrated and described, but embraces all such modified forms thereof as come within the scope of the following claims.

I claim:

1. An ambulance for towing with a snowmobile, comprising:
   a. a steerable front ski unit having a tow bar,
   b. a rear ski unit,
   c. a substantially enclosed elongate body shell longitudinally mounted on said ski units,
   d. a door for opening the rear end of said body shell for removing and reinserting a stretcher, and
   e. said body shell having a pair of longitudinally extending laterally spaced depending ridges formed integrally with the bottom of said shell, said ridges extending substantially the length of said body shell and providing interior recessed tracks for quiding and maintaining a stretcher in place in said body shell.

2. The ambulance for towing with a snowmobile as specified in claim 1 wherein said steerable front ski unit comprises a single leaf spring mounted ski pivotally attached to a mounting frame for limited movement about both substantially vertical and horizontal axes and said rear ski unit comprises a pair of leaf spring mounted skis pivotally attached to a cross-frame for limited movement about a substantially horizontal axis.

3. The ambulance for towing with a snowmobile as specified in claim 2 having a window opening in the top of said body shell, a window covering extending across said window opening and removably secured to said body shell, and wherein the ends of the cross-frame of said rear ski unit extend laterally outward at the sides of the body shell to provide a footrest.

* * * * *